United States Patent [19]

Landoll et al.

[11] Patent Number: 4,630,991
[45] Date of Patent: Dec. 23, 1986

[54] TRUCK HAVING TILTABLE FRONT AND REAR FRAMES

[75] Inventors: Donald R. Landoll; Kyle D. Swart, both of Marysville, Kans.; Joseph B. Morris, Lincoln, Nebr.

[73] Assignee: Landoll Corporation, Marysville, Kans.

[21] Appl. No.: 689,386

[22] Filed: Jan. 7, 1985

[51] Int. Cl.⁴ .................................................. B60P 1/32
[52] U.S. Cl. ..................... 414/478; 414/480; 280/785
[58] Field of Search ............... 414/469, 477, 478, 479, 414/480, 483; 280/785

[56] References Cited

U.S. PATENT DOCUMENTS

| | | | |
|---|---|---|---|
| 2,466,452 | 4/1949 | Lisota | 414/477 |
| 3,159,294 | 12/1964 | Forsythe, Jr. | 414/478 |
| 3,228,546 | 1/1966 | Bunch | 414/483 |
| 3,228,547 | 1/1966 | Coordes | 414/469 |
| 3,485,400 | 12/1969 | Pewthers | 414/477 |
| 3,690,490 | 9/1972 | Hall | 414/477 |
| 3,690,491 | 9/1972 | Butler, Jr. | 414/483 |
| 4,164,297 | 8/1979 | Dorwin | 414/480 X |
| 4,222,698 | 9/1980 | Boelter | 414/477 |
| 4,260,315 | 4/1981 | Bouffard | 414/469 |
| 4,556,357 | 12/1985 | Landoll et al. | 414/469 |

FOREIGN PATENT DOCUMENTS 0138029 10/1981 Japan ................................. 414/469

Primary Examiner—Robert J. Spar
Assistant Examiner—Ken Muncy

[57] ABSTRACT

A structure for buckling the frames of a two-sectioned, centrally articulated truck chassis has a pair of links swingably mounted on the front frame and pivotally connected to a piston and cylinder power assembly carried by the rear frame. Additionally, a control member in overlying, vertical alignment with the piston and cylinder assembly swingably connects the links to the rear frame. As the piston is actuated, the force directly bears on the links, causing the latter to swing and simultaneously move the control member, causing the frames to move upwardly and spread while tilting about their articulation. The entire force presented by the rear mounted cylinder and piston assembly bears directly on the opposite, front frame such that a minimum amount of power is required to effect the tilting. Also, the vertical alignment of the piston and cylinder with the control member reduces bending and bowing stresses in the structure.

5 Claims, 6 Drawing Figures

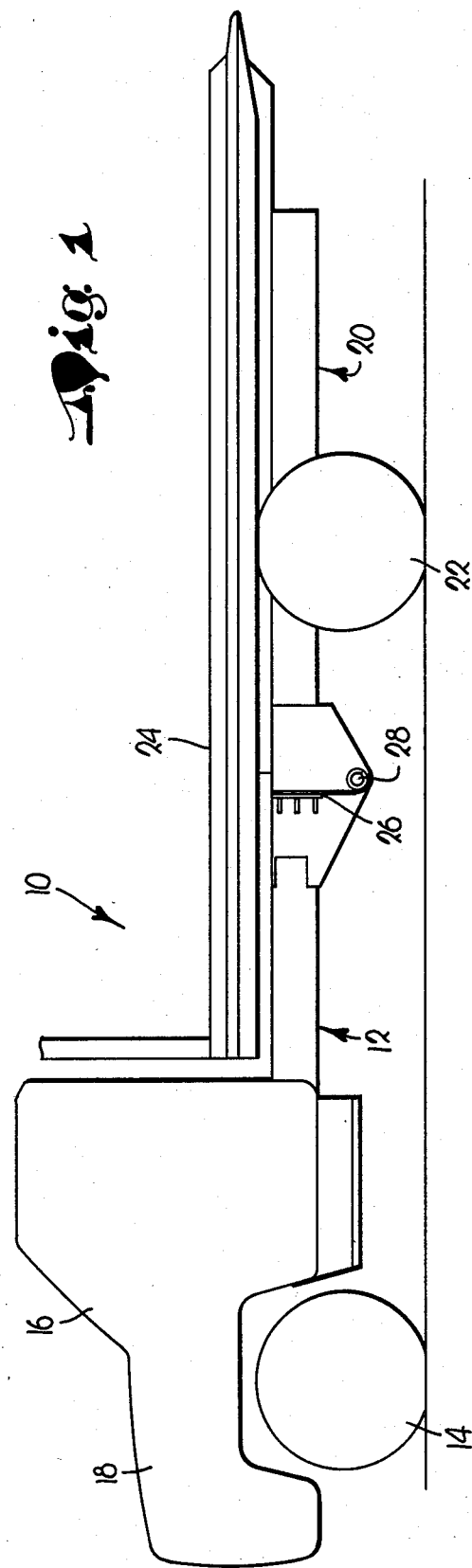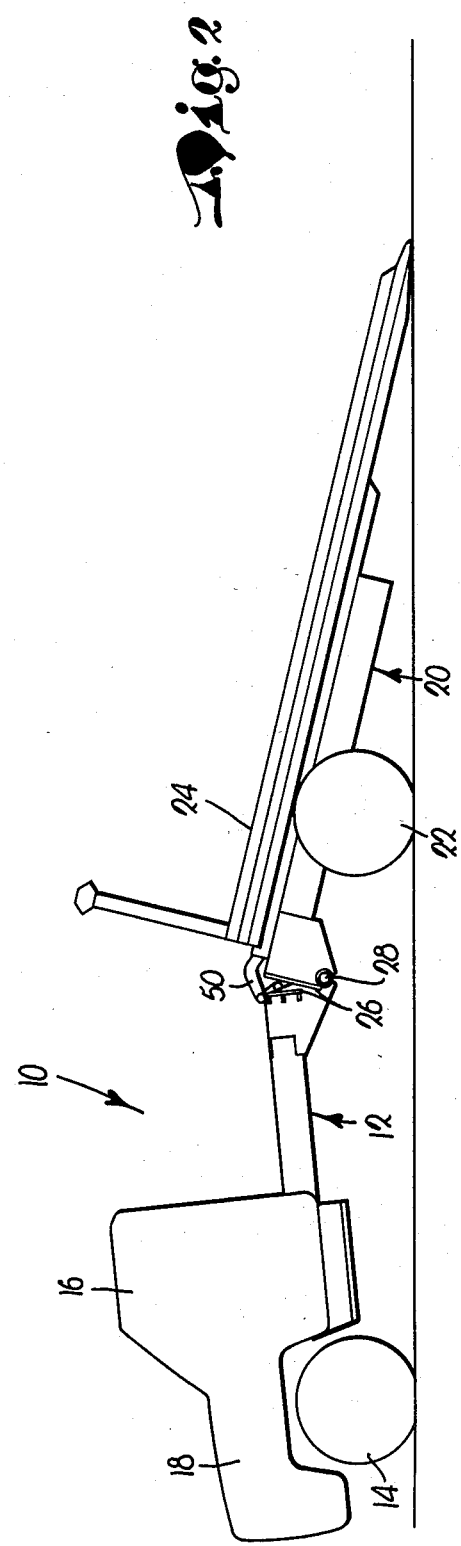

TRUCK HAVING TILTABLE FRONT AND REAR FRAMES

BACKGROUND OF THE INVENTION

1. Field of the Invention

This invention relates to a linkage structure for tilting the frames of a centrally articulated two-sectioned truck chassis.

2. Description of the Prior Art

Truck frames having tiltable beds are widely used for hauling many types of cargo, such as disabled automobiles, farm implements, tractors and the like. Certain types of these trucks, in particular, have a front, cab-supporting frame pivotally joined to a rear frame, the frames operable to simultaneously buckle upwardly about central pivot therebetween. Additionally, the rear frame has a reciprocable bed which is extended toward the ground when the truck frames are swung upwardly at the pivot. Such two-sectioned, pivotally connected truck frames are highly useful because the angle of inclination of the cargo-supporting bed is sufficiently low to provide clearance for loading the vehicles and other cargo to be hauled.

In the past, two-sectioned truck chassis have been provided with various structures for tilting the frames. The disclosure in U.S. Pat. No. 2,466,452, issued to Edward Lisota, illustrates the use of a hydraulic power assembly mounted on the front frame, the assembly having an upwardly extensible piston rod coupled to the reciprocable bed.

In a related pending U.S. application, Ser. No. 06/600,951, filed Apr. 16, 1984 and entitled "Automatic Truck for Hauling Goods", now U.S. Pat. No. 4,556,357, the cylinder and piston assembly is pivotally mounted on the rear frame and connected by a system of linkage to the front frame, the linkage and power assembly overlying the pivotal axis of the frames. The linkage system is comprised of a set of triangular links pivotally mounted on the rear frame, and a generally crescent shaped control link is pivotally connected to the triangular links and to the front frame. As the power assembly swings the triangular links upwardly, the control link simultaneously moves upwardly and forwardly, resulting in opposite tilting of the frames about their pivotal axis. After the cargo is loaded, the power assembly reversely swings the triangular links, pulling the frames downwardly until the latter return to their normal, horizontal position.

SUMMARY OF THE INVENTION

The structure of the present invention can more easily tilt a two-sectioned, centrally articulated chassis with a minimum of expended force, as contrasted to the linkage system of the prior art. Specifically, our structure utilizes a pair of links pivotally supported by the front frame and rotatably joined to the power assembly, the latter rotatably mounted on the rear frame. A control link swingably interconnects the pair of links and the rear frame, the control link being in vertical overlying alignment to the power assembly.

As a result, the entire force presented by the rear frame power assembly is directed to the front frame. Consequently, a much smaller power assembly is required, as compared to prior art construction having linkage mounted on the same frame as the power assembly. In addition, the force required to initialize the tilting movement is minimized. Moreover, alignment of the links with the power assembly eliminates much of the bending stresses, whereby smaller and more lightweight materials may be economically utilized.

IN THE DRAWINGS

FIG. 1 is a side elevational view of a truck for hauling goods made pursuant to our present invention, illustrating the same in its normal over-the-road position;

FIG. 2 is a reduced side elevational view showing the truck and its extended bed in position for loading and unloading cargo;

DETAILED DESCRIPTION

Figure 3:
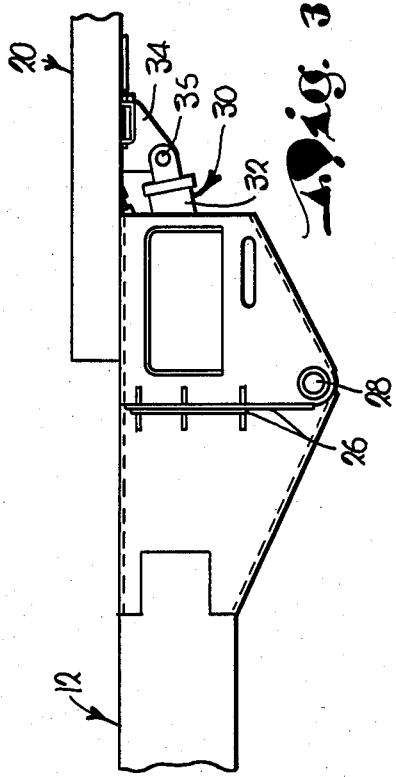
FIG. 3 is an enlarged, fragmentary, side elevational view of the truck frames, the articulation and power means.

The truck of this invention is broadly designated by the numeral 10, and is shown in FIG. 1 in its normal, over-the-road position and in FIG. 2 in its tilted, cargo loading and unloading position. The truck 10 has a chassis with a front frame 12 supported by front steering wheels 14 and carrying a cab 16 and an engine compartment 18. The chassis also includes a rear frame 20 supported by rear driving wheels 22 and having a powered, fore-and-aft reciprocable cargo-receiving bed 24. The rear frame 20 is normally disposed in end-to-end relationship to the front frame 12, and both of the frames 12, 20 have a pair of abutments 26 adjacent their proximal ends.

The frames 12, 20 are tiltable about a normally horizontal axis by means of an articulation 28. When tilted, as shown in FIG. 2, the front frame 14 slopes forwardly from the articulation 28 while the rear frame 20 slants rearwardly, the bed 24 being reciprocally extensible to load and unload cargo as required.

The tilting operation is effected by a power means comprising a hydraulically powered, double acting fluid pressure piston and cylinder assembly 30 having an elongated cylinder 32 connected to a support 34 by means of a pivot 35, the support 34 fixedly mounted on the rear frame 20. A forwardly extending rod 36 is reciprocable within the cylinder 32 to tilt the frames 12, 20 upon manual actuation of a hydraulic pump (not shown).

A structure 38 operably couples the piston and cylinder assembly 30 with the front frame 12. The structure 38 includes a link means comprising a pair of identical, horizontally spaced, generally triangular links 40 mounted on the front frame 12 for swinging movement about an axis parallel with the normally horizontal axis of the tilting movement of the frames 12, 20, the links 40 rotatably mounted on a shaft 42 which is carried by a bracket 44 on the front frame 12. Also, the links 40 are coupled with the piston and cylinder assembly 30 by means of a block 46 attached to the free end of the rod 36, the block 46 pivotally receiving a pin 48, the latter connected to the links 40 therebetween.

Figure 6:
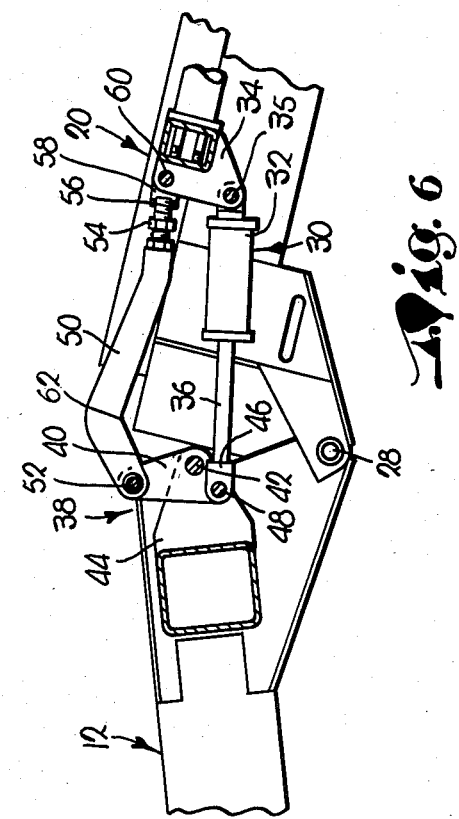
FIG. 6 is an enlarged, fragmentary, side sectional view illustrating details of construction of the truck in a position for loading and unloading cargo.
Figure 4:
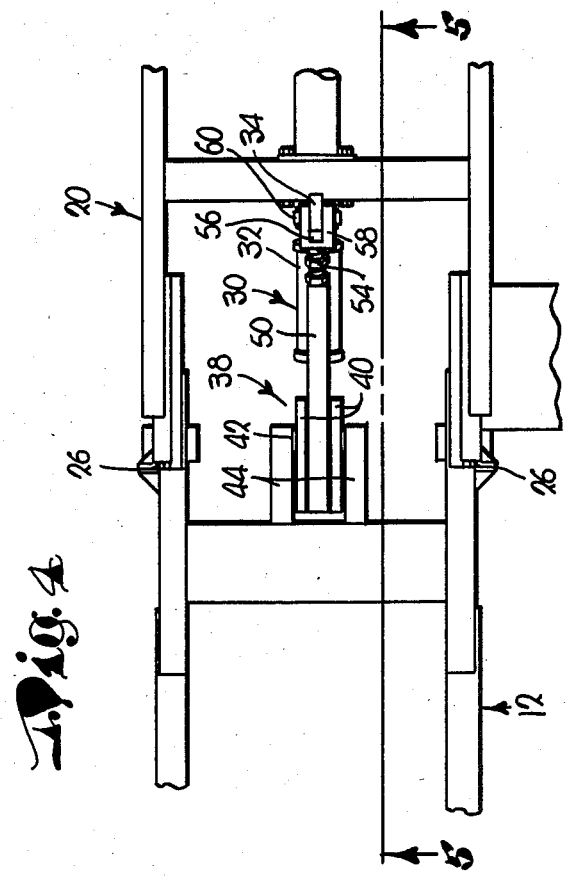
FIG. 4 is an enlarged, fragmentary, top plan view showing the frames, the linkage and power assembly.

The structure 38 also includes an elongated, generally crescent-shaped control 50 pivotally interconnecting the links 40 and the support 34 on the rear frame 20 for tilting the frames 12, 20 during swinging of the links 40. As illustrated in FIG. 6, the control 50 is carried by a pin 52 intermediate the links 40 and is swingable about an axis parallel to the horizontal tilting axis of the frames 12, 20. A turnbuckle 54 adjustably connects the rearward end of the control 50 to a bight 56 of a clevis 58, the latter rotatably carried by a third pin 60 fixedly engaging the support 34.

Figure 5:
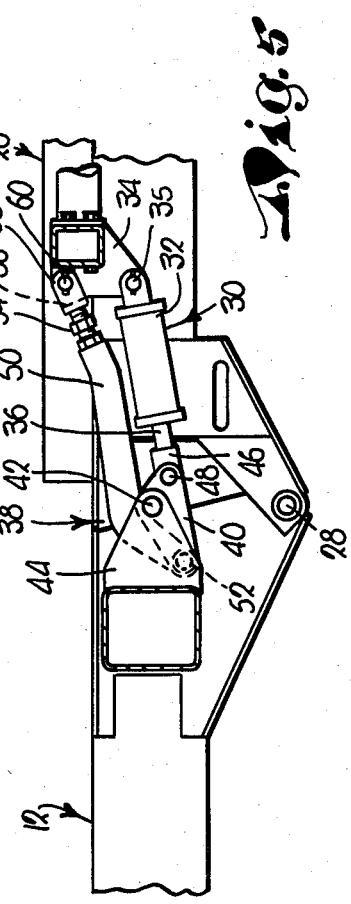
FIG. 5 is a fragmentary, cross-sectional view taken on line 5—5 of FIG. 4.

The control 50 is swingable to an over center position about the swinging axis of the links 40, releasably locking the frames 12, 20 in a substantially horizontal position. As best evinced in FIG. 5, the control 50 has a notch 62 which is disposed partially around the shaft 42 when the frames 12, 20 are horizontal.

OPERATION

In use, the rod 36 is normally retracted within the cylinder 32, maintaining the frames 12, 20 in substantially horizontal alignment as illustrated in FIG. 1 while the abutments 26 preclude downward movement of the frames 12, 20 about the articulation 28. However, as the piston and cylinder assembly 30 is actuated to extend the rod 36, the links 40 swing vertically about the shaft 42, forcing the control 50 to move upwardly and thereby exert a spreading force on the frames 12, 20 above the articulation 28 until the frames 12, 20 are tilted to the position as shown in FIGS. 2, 6.

As should now be obvious to one skilled in the art, the force exerted by the outwardly moving rod 36 is directed entirely to the front frame 12 by means of the links 40. Such structure should be distinguished from the above-referenced pending application wherein the links and the hydraulic cylinder assembly are both mounted on the rear frame, and thus a portion of the force directed to the link would be wastefully applied to the rear frame through the pivot mounting the link. Obviously, as contrasted with the referenced application, the structure of the instant invention requires less power to spread and tilt the frames 12, 20. Similarly, the force necessary to initially move the links 40, and thereby releasably "break" the position of the control 50 upwardly and away from the shaft 42, is reduced substantially.

Noteworthy also is the fact that the present construction vertically aligns the longitudinal axis of the rod 36 with the control 50, consequently ensuring that the force exerted by the piston and cylinder assembly 30 is efficiently transmitted to the links 40 and the control 50. The vertical alignment eliminates bending and other side stresses on the structure 38, whereby smaller, lightweight materials may be employed without fear of breakage. Consequently, the structure 38 as hereinabove disclosed advances the art to a degree previously unknown.

What is claimed is:

1. In a vehicular chassis having a first frame with an end, a second frame with an end proximal to said first frame end, and an articulation interconnecting the ends of respective frames for up and down tilting movement of both frames about a normally horizontal axis, a three-bar linkage assembly to effect tilting of said first frame and said second frame, said linkage assembly comprising:

a first rigid bar means having a first end portion pivotally coupled to said first frame;

a second extensible bar means having a first end portion pivotally coupled to said first frame at a position spaced from said first bar means; and a third rigid bar means having a first portion, a second portion and a third portion, said first bar means having a second end portion pivotally coupled to said third bar means first portion, said second bar means having a second end portion pivotally coupled to said third bar means second portion, said third bar means third portion being pivotally coupled to said second frame at a fixed location on the latter, said second bar means being selectively extensible and retractable for pivoting said third bar means relative to said second frame and for simultaneously swinging said first bar means to thereby tilt said first frame and said second frame.

2. The invention of claim 1, wherein said first bar means has an arcuate configuration for swinging to an over center position about the pivotal couple between said third bar means third portion and said second frame.

3. The invention of claim 1; and a fourth bar means fixed to said first frame, said fourth bar means having a first end portion pivotally coupling said first bar means first end portion to said first frame, said fourth bar means having a second end portion spaced from said fourth bar means first end portion and pivotally coupling said second bar means first end portion to said first frame.

4. The invention of claim 1, wherein said second bar means comprises a hydraulically powered piston and cylinder assembly.

5. The invention of claim 1, wherein said third bar means third portion is disposed between said third bar means first portion and said third bar means second portion.

* * * * *